(12) United States Patent
Watanabe

(10) Patent No.: US 6,972,140 B2
(45) Date of Patent: Dec. 6, 2005

(54) DOOR OPENING TRIM WEATHER STRIP FOR MOTOR VEHICLE

(75) Inventor: Hiroya Watanabe, Novi, MI (US)

(73) Assignee: Toyoda Gosei Co., Ltd., Aichi-ken (JP)

( * ) Notice: Subject to any disclaimer, the term of this patent is extended or adjusted under 35 U.S.C. 154(b) by 83 days.

(21) Appl. No.: 10/721,756

(22) Filed: Nov. 26, 2003

(65) Prior Publication Data

US 2004/0145213 A1     Jul. 29, 2004

(30) Foreign Application Priority Data

Nov. 28, 2002 (JP) ............................. 2002-345658

(51) Int. Cl.$^7$ ................................................ B32B 1/08
(52) U.S. Cl. .................... 428/36.9; 428/122; 49/490.1; 49/498.1
(58) Field of Search ............................. 428/122, 36.9; 49/490.1, 498.1

(56) References Cited

U.S. PATENT DOCUMENTS 6,530,618 B2   3/2003   Nozaki et al.

FOREIGN PATENT DOCUMENTS

JP    A-2000-142266    5/2000

*Primary Examiner*—Alexander S. Thomas
(74) *Attorney, Agent, or Firm*—Posz Law Group, PLC

(57) ABSTRACT

A door opening trim weather strip for a motor vehicle, which exhibits excellent noise insulating properties between a door opening portion of a vehicle body and a door of a motor vehicle, and requires a small force for closing the door, thereby improving feelings in closing the door. The door opening trim weather strip includes a trim portion in which a flange provided in the door opening portion is adapted to be inserted, and a tubular seal portion for sealing between the door opening portion and the door. The tubular seal portion includes two base parts which are respectively composed of a solid rubber and project from an outside surface of an outer side wall of the trim portion integrally therewith, an arc-shaped part which is composed of a sponge rubber and of which ends are respectively connected to the two base parts to form a generally arc-shaped cross-section, and a noise insulating wall which is composed of a sponge rubber and is formed in a space defined by the outer side wall, the two base parts and the arc-shaped part into a generally inverted v-shaped cross-section. The noise insulating wall has a bending part at about a widthwise center thereof. Ends of the noise insulating wall are respectively connected to an inside surface of the arc-shaped part such that at least one portion of the noise insulating wall is foldable between the two base parts.

5 Claims, 3 Drawing Sheets

DOOR OPENING TRIM WEATHER STRIP FOR MOTOR VEHICLE

CROSS-REFERENCE TO RELATED APPLICATION

This application is related to and claims priority from Japanese patent application No. 2002-345658, incorporated herein by reference.

BACKGROUND OF THE INVENTION

1. Field of the Invention

The present invention relates to a door opening trim weather strip for providing a seal between a door opening portion of a vehicle body and a door of a motor vehicle.

2. Description of Related Art

FIG. 1 shows a partially cut away side view of a motor vehicle. To provide a seal between a door opening portion 10 of a vehicle body and a door 12, a door opening trim weather strip (not shown) is attached to the door opening portion 10. One example of a conventional door opening trim weather strip is shown in FIG. 2. As shown, a door opening trim weather strip 14 includes a trim portion 16 having a generally U-shaped cross-section, and a tubular seal portion 18. The door opening trim weather strip 14 is attached to the door opening portion 10 by inserting a flange 20 provided in the door opening portion 10 into the U-shaped trim portion 16.

The trim portion 16 has flange holding lips which respectively project from an inner side wall and an outer side wall thereof. These flange holding lips hold the flange 20 from both sides thereof.

When the door 12 is closed, the tubular seal portion 18 of the door opening trim weather strip 14 contacts and presses a protruding part 22, for example, of the door 12 to seal between the door opening portion 10 and the door 12, thereby preventing the intrusion of rain water and dust as well as noise from the outside of the vehicle body into a vehicle compartment.

The intrusion of noise from the outside of the vehicle body can be prevented by increasing the thickness of the wall of the tubular seal portion 18. However, where the thickness of the wall of the tubular seal portion 18 increases, a counterforce generated by the tubular seal portion 18 upon closing the door 12 increases, thereby requiring a great force for closing the door 12.

In another example of a conventional door opening trim weather strip, which is disclosed in Publication of Japanese unexamined patent application No. 2000-142266, on pages 2 to 3, and FIG. 1, a bridge 24 is provided inside the tubular seal portion 18 for improving the noise insulating properties. The bridge 24 extends so as to cross a gap between the vehicle body and the door 12, namely, in a direction approximately perpendicular to a contacting surface of the tubular seal portion 18 for contacting the door 12 when closed.

Consequently, when the door 12 is closed, the bridge 24 as well as the tubular seal portion 18 generates a counterforce to the door 12, thereby requiring a greater force for closing the door 12.

Where the door 12 comes into contact with the door opening trim weather strip 14 obliquely, as shown in FIG. 2, the tubular seal portion 18 and the bridge 24 which are composed of a sponge rubber are pushed outwardly so that the tubular seal portion 18 tilts obliquely. In such cases, sufficient sealing properties may not be obtained.

SUMMARY OF THE INVENTION

Accordingly, it is an object of the present invention to provide a door opening trim weather strip capable of exhibiting excellent noise insulating properties between a door opening portion of a vehicle body and a door of a motor vehicle, and reducing a door closing force, thereby improving feelings upon closing the door of the motor vehicle.

In accordance with the present invention, a door opening trim weather strip for a motor vehicle for providing a seal between a door opening portion of a body of a motor vehicle, and a door thereof includes a trim portion in which a flange provided in the door opening portion is adapted to be inserted, and a tubular seal portion for sealing between the door opening portion and the door. The trim portion has a generally U-shaped cross-section, and includes an outer side wall, a bottom wall and an inner side wall. The tubular seal portion includes two base parts which are respectively composed of a solid rubber and project from an outside surface of the outer side wall integrally therewith, an arc-shaped part which is composed of a sponge rubber and of which ends are respectively connected to the two base parts to form a generally arc-shaped cross-section, and a noise insulating wall which is composed of a sponge rubber and is formed in a space defined by the outer side wall, the base parts and the arc-shaped part into a generally mountain-shaped or inverted v-shaped cross-section. The noise insulating wall has a bending part at about a widthwise center thereof. Ends of the noise insulating wall are respectively connected to an inside surface of the arc-shaped part such that at least one portion of the noise insulating wall is foldable between the two base parts when the door is closed.

With this arrangement, since the tubular seal portion includes two base parts which are respectively composed of a solid rubber, and project from an outside surface of the outer side wall integrally therewith, joint parts between the tubular seal portion and the trim portion exhibit high rigidity so that where the door comes into contact with the tubular seal portion obliquely, the base parts can keep their original configurations, thereby preventing the tubular seal portion from greatly deforming to ensure sealing properties thereof.

In addition, since ends of the arc-shaped part are respectively connected to the base parts continuously and integrally therewith, and the arc-shaped part is composed of a sponge rubber, and has a generally arc-shaped cross-section, the arc-shaped part exhibits flexibility so as to come into pressure contact with the door in conformity with the uneven surface thereof, thereby improving the sealing properties as well as the noise insulating properties.

And since the noise insulating wall composed of a sponge rubber is provided inside the tubular seal portion for connection to two positions of the inside surface of the arc-shaped part, the tubular seal portion has three walls consisting of an outside wall of the arc-shaped part, the noise insulating wall and an inside wall of the arc-shaped part, thereby improving the noise insulating properties.

Furthermore, since the noise insulating wall is composed of a sponge rubber, the noise insulating wall exhibits the same flexibility as the sponge rubber, and since the noise insulating wall has a generally inverted v-shaped cross-section provided with the bending part at about a widthwise center thereof, and the ends of the noise insulating wall are respectively connected to the inside surface of the arc-shaped part such that at least one portion of the noise insulating wall is foldable between the two base parts, when the door is closed to deform the tubular seal portion, the noise insulating wall readily flexes at the bending part, and at least one portion of the noise insulating wall readily enter a space between the two base parts, thereby preventing an increment of a door closing force.

Consequently, feelings upon closing the door become excellent, and the tubular seal portion is restrained from tilting obliquely.

Preferably, the noise insulating wall is provided with a first connecting part at one end thereof, and a second connecting part at the other end thereof such that the first connecting part is connected to the arc-shaped part in the vicinity of a joint between the base part and the arc-shaped part, and the second connecting part is connected to the arc-shaped part in the vicinity of a position remote from the first connecting part by about one third of a circumference of the arc-shaped part.

With this arrangement, since the first connecting part is arranged to be connected to the arc-shaped part in the vicinity of the joint between the base part and the arc-shaped part, the noise insulating wall is connected to the arc-shaped part composed of not a solid rubber but a sponge rubber so as to exhibit high flexibility and readily flex.

In addition, the second connecting part is arranged to be connected to the arc-shaped part in the vicinity of the position remote from the first connecting part by approximately one third of the circumference of the arc-shaped part, the noise insulating wall can be folded and be accommodated between the two base parts when the tubular seal portion is compressed and deformed by the door.

Preferably, notches are provided at about a widthwise center of the noise insulating wall and the vicinity of the first connecting part of the noise insulating wall.

With this arrangement, since the noise insulating wall has notches, the noise insulating wall flexes more readily when the door is closed, thereby preventing an increment of a door closing force more surely. And since the notch is provided at about a widthwise center of the noise insulating wall, the noise insulating wall bends at about the widthwise center thereof and protrudes toward the center of the tubular seal portion. In addition, the tubular seal portion readily deforms when the door is closed, and a force required for closing the door does not increase. And, since the noise insulating wall bends and protrudes toward the center of the tubular seal portion, and the notch is provided at about a widthwise center of the noise insulating wall, the noise insulating wall can bend by about one half of the entire length thereof when the door is closed. An outside wall of the arc-shaped part, the noise insulating wall and an inside wall of the arc-shaped part do not come into contact with each other to define spaces therebetween, thereby improving the noise insulating properties.

Since the notch is further provided in the first connecting part of the noise insulating wall, the noise insulating wall readily bends at the notch provided in the first connecting part, and the tubular seal portion readily deforms, thereby further reducing a force required for closing the door.

Preferably, the noise insulating wall has a smaller thickness than that of the arc-shaped part.

With this arrangement, since the noise insulating wall has a smaller thickness than that of the arc-shaped part, the noise insulating wall exhibits flexibility so as to readily bend and be folded when the door is closed, and the folded thickness of the noise insulating wall is small, thereby ensuring a great space for further flexing of the tubular seal portion. Consequently, when the door is closed, the tubular seal portion readily flexes, thereby preventing an increment of a force required for closing the door.

Preferably, the base parts respectively project by such a height that when the tubular seal portion is compressed and deformed by the door of a motor vehicle, and the noise insulating wall bends and is folded, at least a bending part along about a widthwise center of the noise insulating wall is accommodated between the base parts.

With this arrangement, since the base parts are formed to respectively have a height from the outer side wall of the trim portion, which is capable of accommodating the noise insulating wall therebetween when the noise insulating wall bends, the noise insulating wall is accommodated between the two base parts when the door is closed to bend and fold the noise insulating wall, whereby the arc-shaped part readily flexes and a force required for closing the door can be reduced.

In addition, since the two base parts, each projecting from the outer side wall of the trim portion, are composed of a solid rubber, the two base parts exhibit rigidity so that where the arc-shaped part of a sponge rubber is pulled obliquely when the door comes into contact with the arc-shaped part obliquely, the two rigid base parts are not pulled, thereby preventing the tilting of the tubular seal portion.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
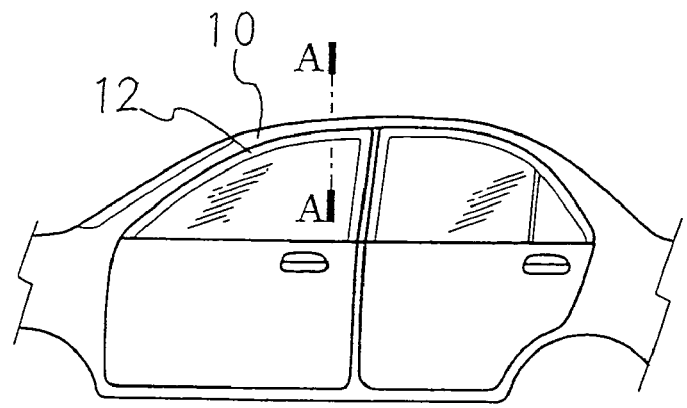
FIG. 1 is a partially cut away side view of a motor vehicle.
Figure 2:
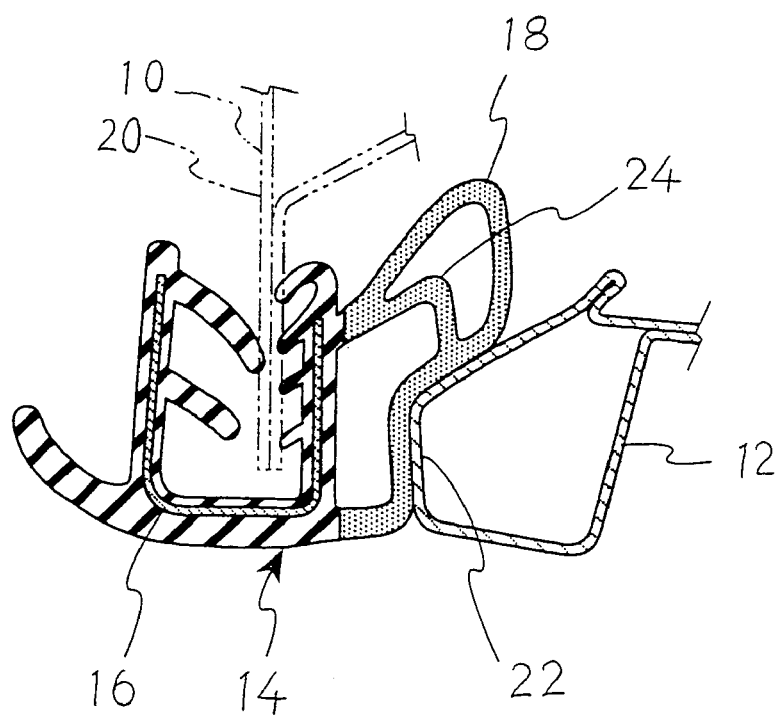
FIG. 2 is a cross-sectional view of a conventional door opening trim weather strip in an attached state to a door opening portion of a motor vehicle, which is taken along the line of A—A of FIG. 1.
Figure 3A:
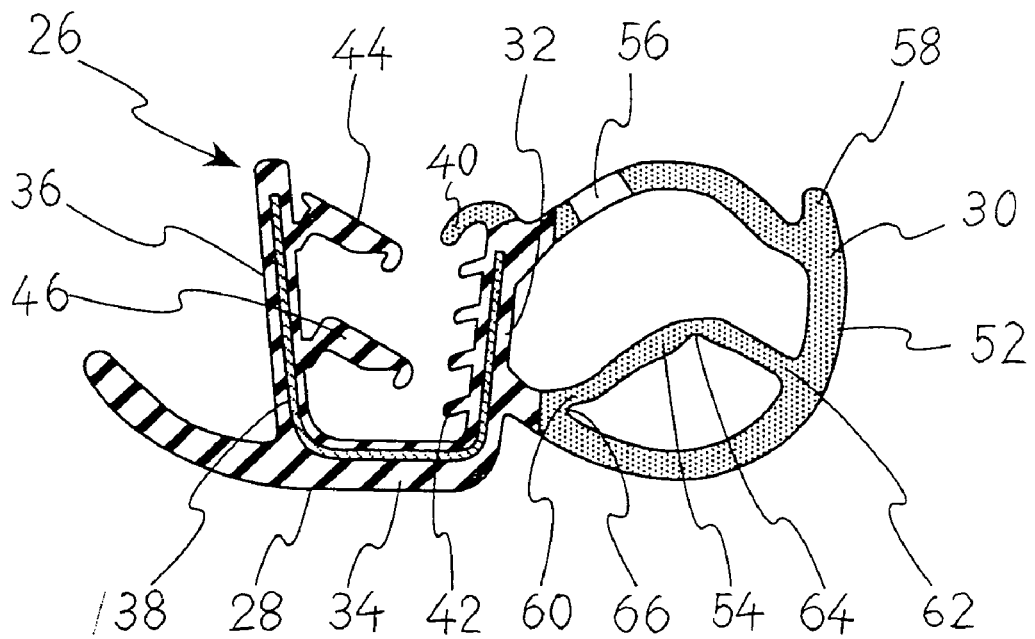
FIG. 3(a) is a cross-sectional view of one embodiment of a door opening trim weather strip in accordance with the present invention, which is prior to the attachment to a door opening portion of a motor vehicle.
Figure 3B:
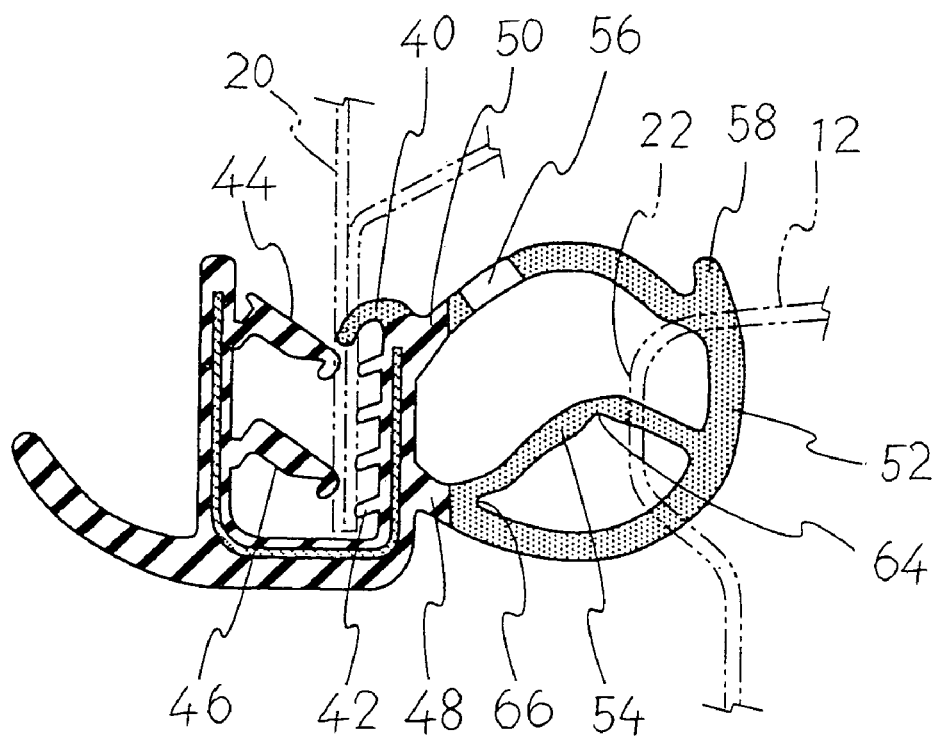
FIG. 3(b) is a cross-sectional view of one embodiment of a door opening trim weather strip in accordance with the present invention in an attached state to a door opening portion of a motor vehicle, which is taken along the line of A—A of FIG. 1.
Figure 4:
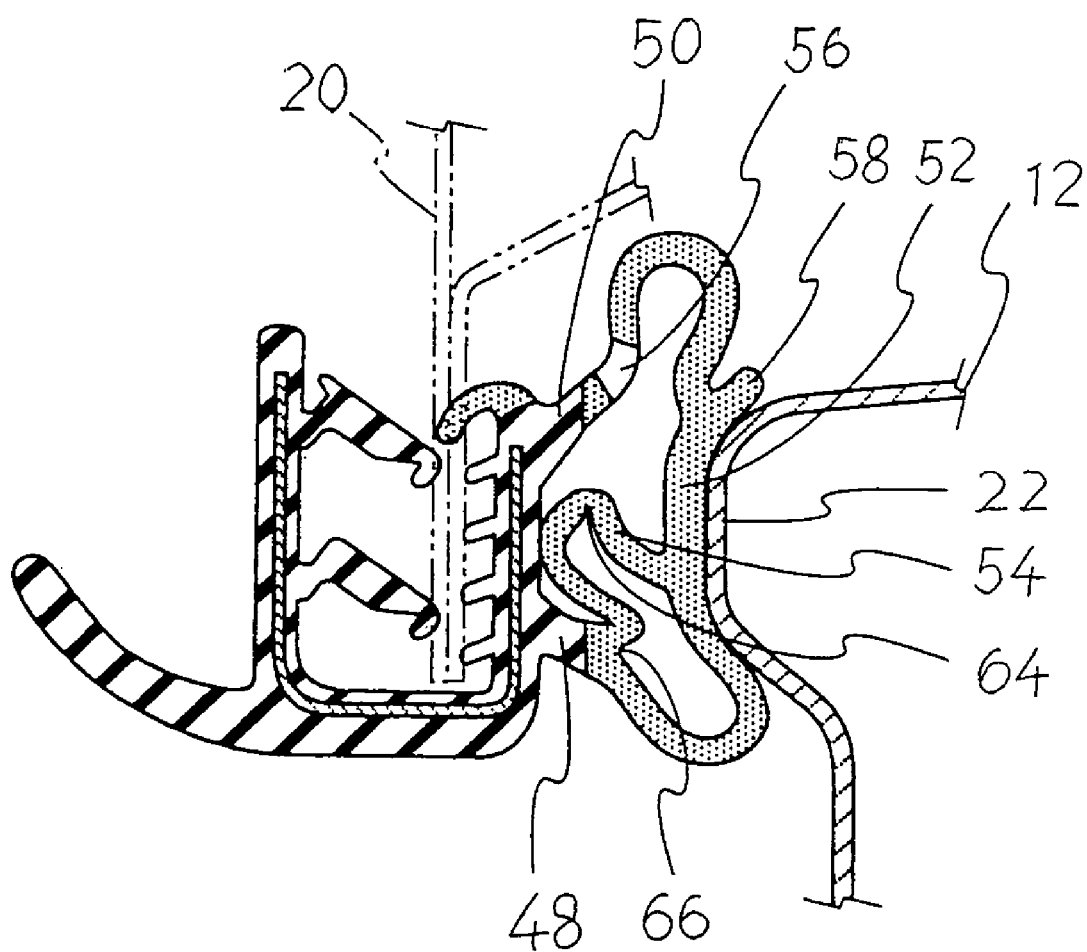
FIG. 4 is a cross-sectional view of one embodiment of a door opening trim whether strip in accordance with the present invention, which is in a deformed state due to the closing of a door of a motor vehicle.

Hereinafter, one embodiment of the present invention will be explained with reference to the drawings. FIGS. 3(a) and 3(b) are cross-sectional views of one embodiment of a door opening trim weather strip in accordance with the present invention. FIG. 3(a) shows the door opening trim weather strip which is prior to the attachment to a door opening portion of a motor vehicle, and FIG. 3(b) shows the cross-section of the door opening trim weather strip in an attached state to the door opening portion of the motor vehicle, which is taken along the line of A—A of FIG. 1.

As shown in FIGS. 3(a) and 3(b), a door opening trim weather strip 26 includes a trim portion 28 for attaching to a flange 20 in a door opening portion 10 of a vehicle body, and a tubular seal portion 30 for contacting a protruding part 22 of a door frame of a door 12 to provide a seal between the door opening portion 10 and the door 12.

The trim portion 28 includes an outer side wall 32, a bottom wall 34 and an inner side wall 36, and is formed to have a generally U-shaped cross-section in the attached state to the flange 20. The door opening trim weather strip 26 is attached to a vehicle body by a roll forming method. The outer side wall 32 and the inner side wall 36 of the trim portion 28 prior to the attachment to the flange 20 are slightly spread apart to enlarge the width of an open mouth thereof to facilitate the insertion of the flange 20 in the trim portion 28. After the trim portion 28 is positioned on and provisionally fixed to the flange 20 by inserting the flange 20 in the trim portion 28, the outer side wall 32 and the inner side wall 36 of the trim portion 28 are clamped to narrow the width of the open mouth of the trim portion 28 by means of a pair of clamping rollers into a generally U-shaped cross-section. Thus, the attachment of the door opening trim weather strip 26 is completed.

A core member 38 is embedded in the outer side wall 32, the bottom wall 34 and the inner side wall 36 of the trim portion 28, thereby improving the holding strength of the trim portion 28 against the flange 20.

The core member 38 may be composed of a metal sheet such as a steel sheet, etc. or a hard synthetic resin sheet. In the case of metallic core members, in order to exhibit flexibility which facilitates the attachment of the door opening trim weather strip 26 to corners, strip-shaped metal sheets are joined to each other via connecting parts. After forming the trim portion 28, the connecting parts of the core member 38 are cut off, thereby further improving the flexibility of the trim portion 28.

The trim portion 28 may be also formed by covering the core member 38 with solid rubber.

As described above, the tubular seal portion 30 is formed on an outside surface of the outer side wall 32 of the trim portion 28 integrally therewith.

A curved outer lip 40 is provided at an opening end of the outer side wall 32 and extends toward the interior of the trim portion 28. Four outer lips 42 extend from an inside surface of the outer side wall 32 toward the interior of the trim portion 28, whereas two inner lips 44 and 46 extend from an inside surface of the inner side wall 36 toward the interior of the trim portion 28. After the trim portion 28 is mounted on the flange 20 by a roll forming method, as shown in FIG. 3(b), the four outer lips 42 and the two inner lips 44 and 46 hold the flange 20 from both sides thereof, whereby the trim portion 28 is mounted on the flange 20, and a seal is provided between the trim portion 28 and the flange 20. The outer lips 42 and the inner lips 44 and 46 flex with the variation of the thickness of the flange 20 to surely hold the flange 20.

The tubular seal portion 30 includes two base parts 48 and 50 which are respectively composed of a solid rubber identical to that of the outer side wall 32. The two base parts 48 and 50 are formed on the outside surface of the outer side wall 32 integrally therewith, and extend from two positions near the bottom wall 34 and near the open mouth of the trim portion 28. And an arc-shaped part 52 composed of a sponge rubber is formed continuously with the base parts 48 and 50 into a generally arc-shaped cross-section. The tubular seal portion 30 further includes a noise insulating wall 54 which has an inverted v-shaped cross-section and extends in a space defined by the outer side wall 32, the base parts 48 and 50, and the arc-shaped part 52. The noise insulating wall 54 connects two positions of the arc-shaped part 52 like a bridge.

The base part 48 projects from a lower portion of the outside surface of the outer side wall 32 obliquely downwardly by a height about twice the thickness of the noise insulating wall 52.

The base part 50 projects from an upper portion of the outside surface of the outer side wall 32, which is near the open mouth of the trim portion 28, obliquely upwardly by a height about twice the thickness of the noise insulating wall 54. When a door 12 is closed, the tubular seal portion 30 is compressed by the door 12, and consequently, the tubular seal portion 30 deforms and the noise insulating wall 54 is folded in the space of the tubular seal portion 30. Since the base parts 48 and 50 are respectively formed to have a height about twice the thickness of the noise insulating wall 52, the noise insulating wall 54 can be accommodated between the base parts 48 and 50, thereby allowing the deformation of the tubular seal portion 30. In addition, since the base parts 48 and 50 are composed of a solid rubber, they can prevent the tubular seal portion 30 from tilting sideward of the base parts 48 and 50 when the door 12 contacts and compresses the tubular seal portion 30 obliquely.

The arc-shaped part 52 is composed of a sponge rubber, and is formed continuously and integrally with the base parts 48 and 50 into an generally arc-shaped cross-section. A through hole 56 is formed in the arc-shaped part 52 to let air escape from the space of the tubular seal portion 30 when the tubular seal portion 30 is compressed by the closed door 12, thereby facilitating the deformation of the tubular seal portion 30, and reducing a force required for closing the door 12.

A projection 58 is provided at a top of the arc-shaped part 52 for contacting the protruding part 22 of the door 12. If there occur gaps between the tubular seal portion 30 and the protruding part 22 due to the unevenness of the protruding part 22 when the tubular seal portion 30 contacts the door 12, the projection 58 of the tubular seal portion 30 comes into close contact with the protruding part 22, thereby improving the sealing properties between the tubular seal portion 30 and the door 12.

The noise insulating wall 54 is composed of a sponge rubber and is formed integrally with the arc-shaped part 52. The noise insulating wall 54 has a generally inverted v-shaped cross-section, and includes a first connecting part 60 and a second connecting part 62 for connecting to two positions of the arc-shaped part 52. The first connecting part 60 is connected to the arc-shaped part 32 near the base part 48. Since both the arc-shaped part 52 and the noise insulating wall 54 are composed of a sponge rubber, the noise insulating wall 54 readily bends at the first connecting part 60, thereby facilitating the deformation of the tubular seal portion 30 when the arc-shaped part 52 is compressed by the door 12.

The second connecting part 62 is connected to the arc-shaped part 52 in the position remote from the first connecting part 60 by about one third of the circumference of the arc-shaped part 52. Namely, the second connecting part 62 is connected to the arc-shaped part 52 in the position which is slightly apart from a top part for contacting the door 12 toward the first connecting part 60. With this arrangement, when the door 12 contacts and compresses the tubular seal portion 30, the noise insulating wall 54 extends obliquely to the door 12, and accordingly, the noise insulating wall 54 does not push the door 12 outwardly. Consequently, a force required for closing the door 12 does not increase. In addition, when the door 12 is closed to bend the noise insulating wall 54, a bending part of the noise insulating wall 54 is separated from the arc-shaped part 52 to define a space between the noise insulating wall 54 and the arc-shaped part 52, thereby achieving excellent noise insulating properties.

As shown in FIG. 3(*b*), the noise insulating wall 54 has a generally inverted v-shaped cross-section which protrudes upwardly in the space of the arc-shaped part 52. The noise insulating wall 54 with such a configuration can readily bend upwardly when the tubular seal portion 30 is compressed and deformed upon closing the door, thereby ensuring the deformation of the tubular seal portion 30.

A first notch 64 and a second notch 66 are provided in the noise insulating wall 54. The first notch 64 is provided in a lower surface of the bending part of the noise insulating wall 54. The first notch 64 thus provided further facilitates the bending of the noise insulating wall 54, thereby reducing the door closing force. The length from the first connecting part 60 to the first notch 64 is made shorter than the length from a projecting end of the base part 48 to a projecting end of the base part 50.

The second notch 66 is provided in the vicinity of a joint between the first connecting part 60 and the arc-shaped part 52. By virtue of the second notch 66, the noise insulating wall 54 readily bends at the second notch 66 when the tubular seal portion 30 is compressed and deformed by the door 12, thereby reducing the door closing force.

As described above, when the tubular seal portion 30 is compressed and deformed upon closing the door 12, the noise insulating wall 54 is folded at about a widthwise center thereof and shifts toward the outer side wall 32 by virtue of the first notch 64 and the second notch 66. And when the tubular seal portion 30 is further compressed, the portion of the noise insulating wall 54, which ranges from the first connecting part 60 to the first notch 64, is accommodated between the base part 48 and the base part 50.

In addition, the thickness of the noise insulating wall 54 is formed smaller than that of the arc-shaped part 52, whereby the flexibility of the noise insulating wall 54 is enhanced, and consequently, the noise insulating wall 54 can readily bend when the door 12 is closed. And the folded thickness of the noise insulating wall 54 is small, thereby making the folded noise insulating wall 54 compact, and enlarging the space for flexing of the tubular seal portion 30. Consequently, the tubular seal portion 30 can readily flex when the door 12 is closed, thereby reducing a required door closing force.

Since at least the portion of the noise insulating wall 54, which ranges from the first connecting part 66 to the first notch 64, is accommodated between the base parts 48 and 50, the noise insulating wall 54 is prevented from contacting the solid base parts 48 and 50, whereby the noise insulating wall does not obstruct the deformation of the tubular seal portion 30. In addition, the noise insulating wall 54 is prevented from contacting the arc-shaped part 52, whereby the arc-shaped part 52 is not deformed greatly.

Since both the base parts 48 and 50 are formed to have a height capable of accommodating the bending noise insulating wall 54 therebetween, namely, a height which is about twice the thickness of the noise insulating wall 54, the noise insulating wall 54 which bends and is folded upon closing the door 12 is accommodated between the base parts 48 and 50, thereby enlarging the space for the deformation of the arc-shaped part 52. Consequently, the arc-shaped part 52 readily flexes to reduce a required force for closing the door 12.

In addition, since the base parts 48 and 50 are formed of a solid rubber integrally with the outer side wall 32 of the trim portion 28, they exhibit rigidity. Therefore, when the door 12 contacts and compresses the tubular seal portion 30 obliquely to pull the arc-shaped part 52 composed of a sponge rubber obliquely, the base parts 48 and 50 are prevented from being pulled, and consequently, the configuration of the tubular seal portion 30 can be prevented from greatly deforming.

Next, the method for producing the door opening trim weather strip 26 thus arranged will be explained.

The door opening trim weather strip 26 is formed by extrusion with a core member 38 of metal or hard synthetic resin embedded in the trim portion 28. A solid rubber for the core member 38 and the trim portion 26 and a sponge rubber for the tubular seal portion 30 are integrally extruded by an extruder. Then, a resultant extruded material is vulcanized in a vulcanizing chamber by a normal vulcanizing method such as high frequency vulcanization, hot air vulcanization, etc., and cut to predetermined dimensions, whereby a door opening trim weather strip 26 is obtained.

Next, the method for mounting the door opening trim weather strip 26 thus produced on a flange 20 which is provided in a door opening portion of a vehicle body will be explained.

FIG. 3(*b*) shows the state where the door opening trim weather strip 26 is mounted on the flange 20 of the vehicle body.

To mount the door opening trim weather strip 26 on the flange 20, at first, the door opening trim weather strip 26 having the trim portion 28 of which side walls are slightly spread apart, as shown in FIG. 3(*a*), is positioned on and provisionally set on the flange 20 by holding a projecting end of the flange 20 with the second inner holding lip 46 and the bottom-side outer holding lip 42 of the trim portion 28.

Then, the provisionally set door opening trim weather strip 26 is mounted on the flange 20 by a roll forming method. The outer side wall 32 and the inner side wall 36 of the trim portion 28 are further bent towards each other to narrow the open mouth of the trim portion 28 and make the outer side wall 32 and the inner side wall 36 parallel with each other, whereby the holding lips 42, 44, and 46 of the trim portion 28 can securely hold the flange 20 of the vehicle body.

Since the side walls of the trim portion 28 are slightly spread apart toward the open mouth thereof, the positioning and provisionally setting of the trim portion 28 can be carried out without being blocked by the holding lips, whereby the mounting work of the trim portion 28 with the roll forming method is facilitated.

In accordance with the present invention, since the door opening trim weather strip has the tubular seal portion thus arranged, the door opening trim weather strip can exhibit excellent noise insulating properties between the door and the door opening portion, and can reduce a force required for closing a door.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door opening trim weather strip for a motor vehicle for providing a seal between a door opening portion of a body of a motor vehicle, and a door thereof, comprising:
    a trim portion in which a flange provided in the door opening portion is adapted to be inserted; and
    a tubular seal portion for sealing between the door opening portion and the door, said trim portion having a generally U-shaped cross-section, and including an outer side wall, a bottom wall and an inner side wall, said tubular seal portion including two base parts which are respectively composed of a solid rubber and project from an outside surface of said outer side wall integrally therewith, an arc-shaped part which is composed of a sponge rubber and of which ends are respectively connected to said two base parts to form a generally arc-shaped cross-section, and a noise insulating wall which is composed of a sponge rubber and is formed in a space defined by said outer side wall, said base parts and said arc-shaped part into a generally inverted v-shaped cross-section, said noise insulating wall having a bending part at about a widthwise center thereof, ends of said noise insulating wall being respectively connected to an inside surface of said arc-shaped part such that at least one portion of said noise insulating wall is foldable between said two base parts.

2. A door opening trim weather strip for a motor vehicle as claimed in claim 1, wherein said noise insulating wall includes a first connecting part for connection to said arc-shaped part in a vicinity of a joint between said base part and said arc-shaped part of said tubular seal portion, and a second connecting part for connection to said tubular part in a vicinity of a position remote from said first connecting part by about one third of a circumference of said arc-shaped part.

3. A door opening trim weather strip for a motor vehicle as claimed in claim 2, wherein notches are provided at said about a widthwise center of said noise insulating wall, and a vicinity of said first connecting part of said noise insulating wall.

4. A door opening trim weather strip as claimed in claim 1, wherein said noise insulating wall has a smaller thickness than that of said arc-shaped part.

5. A door opening trim weather strip as claimed in claim 1, wherein said two base parts respectively project by such a height that when said tubular seal portion is compressed and deformed by the door of a motor vehicle, and said noise insulating wall bends and is folded, at least said bending part along said about a widthwise center of said noise insulating wall is accommodated between said two base parts.

* * * * *